June 2, 1936.  J. F. WALLACE  2,042,569
PISTON PACKING
Filed May 10, 1930
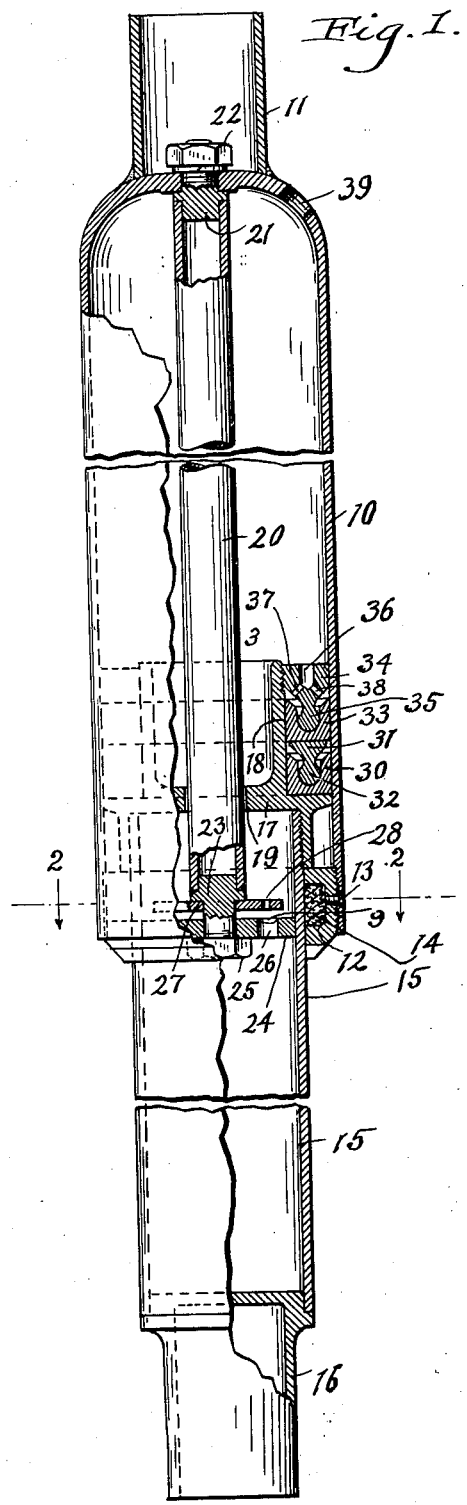
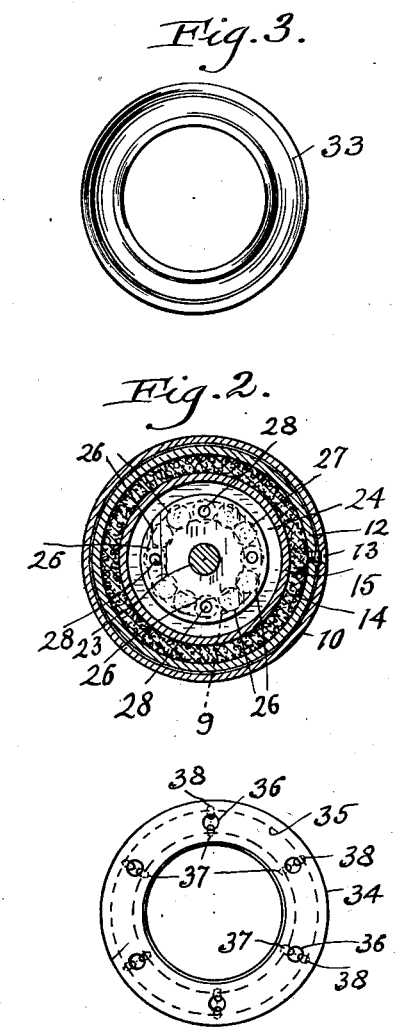
Inventor
John F. Wallace
Kwis Hudson & Kent
attys.

Patented June 2, 1936

2,042,569

UNITED STATES PATENT OFFICE 2,042,569

PISTON PACKING

John F. Wallace, Cleveland, Ohio, assignor to The Cleveland Pneumatic Tool Company, Cleveland, Ohio, a corporation of Ohio Application May 10, 1930, Serial No. 451,250

5 Claims. (Cl. 309—31)

This invention relates to improvements in piston packing intended primarily for use in shock absorbers for aircraft.

One of the objects of the invention is the provision of simple and inexpensive means for preventing the loss of fluid and pressure in a shock absorber.

Another object is the provision of packing such that the fluid pressure within the strut may be utilized to hold the packing tightly against the piston and cylinder in order to maintain a seal at all times.

A further object is the provision of a piston packing which shall be adapted to wipe oil from the walls of the cylinder when the piston is moving inwardly.

Another object is the provision of an unsecured U-shaped packing with means for exposing the open side thereof to the fluid pressure within the strut for holding the side walls of the packing outwardly against the piston and cylinder respectively.

Other objects and features of novelty will appear as I proceed with the description of that embodiment of the invention which, for the purposes of the present application, I have illustrated in the accompanying drawing, in which, Figure 1 is an elevational view of an airplane strut embodying the present invention, certain of the parts being broken away and others shown in central vertical section in order to more fully illustrate the invention.

Figure 2 is a cross sectional view taken substantially on the line 2—2 of Figure 1.

Figure 3 is a plan view of one of the resilient packing rings.

Figure 4 is a plan view of a securing ring for holding the packing ring in position on the piston head.

In the drawing, the cylinder of a hydro pneumatic shock absorber is illustrated at 10. Preferably this cylinder is made of steel tubing which is spun over at the upper end to form a cylinder head. To this head a piece of smaller tubing 11 may be welded, such smaller tubing serving as means for attachment to the wings or fuselage of the plane. To the bottom end of the cylinder 10 I thread a packing gland 12, and hold it against movement by set screw 13.

The packing 14 in this gland receives a smaller cylinder 15 which acts partly as the main piston rod and partly as a rebound checking cylinder. To its lower end I weld a fitting 16 by means of which attachment is made to the running gear of the plane. On the upper end of the small cylinder 15 I thread a piston head 17, on the outer side of which there is an annular recess 18 in which the piston head packing is located.

The piston head 17 is provided centrally with a circular hole 19 which is slightly larger than a hollow rod 20 that extends through the hole. At its upper end this rod 20 is attached to the head of the cylinder 10 by means of a plug 21 welded to the rod and extending through a hole in the cylinder head, its upper portion being threaded for the reception of a nut 22. To the lower end of the rod 20 there is welded a similar plug 23 which however, has a somewhat longer stem. This stem supports a metal disc 24 which has a free sliding fit within the cylinder 15. It is held upon the stem by a nut 25. The disc 24 is provided with a plurality of openings 26. On the stem of the plug 23 above the disc 24 there is slidably supported a second disc 27, in which there are a series of smaller openings 28. The disc 27 is free to rotate, and the openings 26 are close enough together so that each of the openings 28 will always register to a greater or lesser extent with one of the openings 28, no matter what the angular position the disc 27 may assume. In order to provide further assurance that the flow of liquid through the piston will never be completely cut off, I cut an annular groove 9 in the upper surface of disc 24 directly beneath the openings 28 and intercepting the openings 26. When the two cylinders 10 and 15 are telescoped together upon the impact stroke, oil in the lower part of cylinder 15 flows readily through the large opening 26 and around the disc 27 into the space above the disc 24. On the reverse or rebound stroke, however, the disc 27 moves into engagement with the disc 24 and the flow then has to take place through the small openings 28, the rebound therefore being slowed up accordingly.

Returning now to the piston head construction, a ring 30 of flexible material, substantially U-shaped in cross section, is slipped over the end of the piston head 17 into the annular recess 18 and moved down onto the shoulder forming the base of the recess. This ring is made preferably of rubberized fabric. It may be molded with its outer walls inclined outwardly toward the top to a slight extent only. Its walls are beveled off on the inner side of the outer leg and the outer side of the inner leg. Next I drop a ring 31 of metal or other material over the upper end of the piston head 17, this ring having an upper flat face and a depending portion or projection 32 that is preferably rounded to fit more or less snugly the bottom of the groove in the packing ring 30. The projection 32 may or may not be continuous throughout the extent of the ring 31.

After the rings 30 and 31 are in place as above stated, I slip another packing ring 33 into the recess 18, this ring being identical with the ring 30. I then thread a metal or other rigid ring 34 onto the end of the piston head, this latter ring having a projection 35 extending into the groove of the ring 33 in the same manner as the projection 32 fits into the groove of ring 30. This ring 34 is provided at regular intervals with sockets 36 serving as wrench sockets by means of which the ring may be screwed onto and off the piston head. These sockets, however, in conjunction with the small passages 37 and 38, have the additional function of providing communication between the interior of cylinder 10 and the recess 18 above the packing 33, whereby the fluid pressure within the cylinder 10 is transmitted to the beveled faces of the two legs of ring 33 to hold the walls of the latter packing ring in sealing contact with the wall of recess 18 and the wall of cylinder 10. Hence there can be no leakage of pressure past the packing along either one of these two walls. When the parts are assembled, the ring 34 is not threaded down far enough to put the packing rings 33 and 30 under compression, but merely far enough to prevent the loose rings 32, 31 and 33 from coming off the piston head should the pressure within the device become dissipated for some reason. Of course, so long as the pressure is maintained, the rings will be held thereby in the recess 18, and at such times the ring 34 is not needed. However, it is useful for holding the packing elements in position during the assembling of the device.

Near the top of the cylinder 10 I form a threaded opening 39 for the reception of an air valve, not shown, through which air may be introduced for the purpose of inflating the device to the desired extent. In practice, the strut is attached to the airplane, after which as much oil is put into it as the strut will hold in its compressed condition, when the strut is inflated sufficiently to expand it to a predetermined extent.

I have found in practice that a single packing ring will be sufficient in most cases to effect a satisfactory seal, but because of the fact that inaccuracies in workmanship will sometimes creep in, I prefer to back up the ring 33, so to speak, with a second ring 30 in order to take care of possible leakage past the first ring. A still greater number of packing rings could of course be employed, although I do not deem it necessary to increase the number for the usual cases where the packing is submerged in oil, as in the present instance.

While in the foregoing description and in the accompanying drawing, I have disclosed one particular embodiment of the invention more or less in detail, I desire it to be understood that such detailed disclosure has been resorted to primarily for the purpose of fully illustrating the invention in conformity with the requirements of the statute, and that it is not to be construed as amounting to a limitation upon the scope of the invention.

Having thus described my invention, I claim:

1. In combination, a piston comprising a head having an external annular recess and a packing adapted to fit said recess and engage the inner wall of a cooperating cylinder as well as the recessed wall of the piston, said packing comprising a ring of flexible material U-shaped in cross section, a ring of hard material threaded onto the piston head and having an annular projection extending into the groove of said U-shaped packing ring to space the latter away from the major portion of said hard ring, said hard ring having spanner wrench sockets therein on the side exposed to the pressure in the cylinder, and having perforations extending from said sockets to the opposite sides of the annular projection, adapted to bring into communication with the interior of the cylinder the space within the packing ring on either side of the annular projection.

2. In combination, a piston comprising a head having an external annular recess and a packing adapted to fit said recess, said packing comprising a plurality of rings of flexible non-metallic material U-shaped in cross section, an equal number of rings of hard material movable with said head, each of said last named rings having a projection extending into the recess of the adjacent U-shaped packing ring, spacing the body of the hard ring away from the lips of the U-shaped ring, and leaving the lips thereof free to move inwardly or outwardly.

3. In combination, a piston comprising a head having an external annular recess and a packing adapted to fit said recess, said packing comprising a plurality of rings of flexible non-metallic material U-shaped in cross section, and an equal number of rings of hard material having annular projections extending into the grooves of said packing rings, spacing the bodies of the hard rings away from the lips of the U-shaped rings and leaving the lips thereof free to move inwardly or outwardly, the forward one of said hard rings being secured to the piston head extending outwardly flush with the perimeter of the head and another of said hard rings acting as a spacer between the packing rings on either side thereof.

4. In combination, a piston comprising a head having an external annular recess and a packing adapted to fit said recess, said packing comprising a plurality of rings of flexible non-metallic material U-shaped in cross section with a flat end surface and cylindrical outer surfaces, an equal number of rings of hard material movable with said head, each of said last named rings having a projection extending into the recess of the adjacent U-shaped packing ring and one of said hard rings having a flat end surface for engagement with the flat surface of an adjacent flexible ring, spacing the body of the hard ring away from the lips of the U-shaped ring, and leaving the lips thereof free to move inwardly or outwardly.

5. In combination, a piston comprising a head having an external annular recess and a packing adapted to fit said recess, said packing comprising a plurality of rings of flexible non-metallic material U-shaped in cross section with a flat end surface and cylindrical outer surfaces, and an equal number of rings of hard material each having an annular projection extending into the groove of an adjacent packing ring, spacing the bodies of the hard rings away from the lips of the U-shaped rings and leaving the lips thereof free to move inwardly or outwardly, the forward one of said hard rings being secured to the piston head extending outwardly flush with the perimeter of the head and another of said hard rings acting as a spacer between the packing rings on either side thereof, said last named hard ring having a flat end surface for engagement with the flat surface of the next flexible ring.

JOHN F. WALLACE.